6429X
A. W. SUMMER.
THRESHING MACHINE.
Patented Mar. 21, 1831.
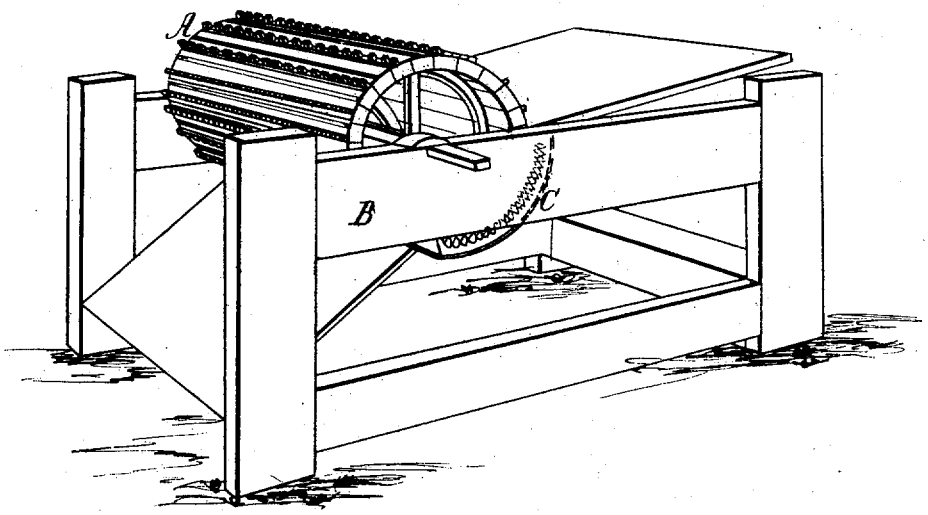
THE NORRIS PETERS CO., PHOTO-LITHO., WASHINGTON, D. C.

Abram W. Summers, of Gates. N. York,
Letters Patent.

The schedule referred to in these Letters Patent and making part of the same containing a description in the words of the said Abram W. Summers. himself of his Improvement: called the float and tooth threshing machine To all and to whom these presents shall come, Abraham W. Summers of the town of Gates and County of Monroe and State of New York, — Be it known that I Abram W. Summers have invented a new and useful improvement in threshing machines not known or used before my application This Machine like all others of the same kind consists of posts, girts, cylinder, pulleys &c and differs but little from that kind of Machine which has a cylinder with teeth and a concave bed with bars The improvement in this machine consists in an increased size of cylinder, the diameter is fourteen inches and a row of teeth and a float, alternate dividing the surface into twenty eight equal parts, The floats are made of band iron and let in between the lagging and fastened with screws to the edge of each where they are put on the cylinder, and project five eighths from the surface between each of these floats there is a row of teeth of three eighths round iron, and placed one inch from centre to centre and project one inch from the surface, making the full diameter sixteen inches, and the teeth in one row covers the space in the other, or its proportion of it the principal use of these floats is to prevent the straw forming a wisp around the cylinder (which will be the case when the straw is a little wet) also helps to keep the straw close to the concave bars, the concave is a full quarter circle from the feeding apron - this concave is formed of bar iron wrought diamonding of one inch square running parallel with the floats, and rows of teeth, so placed that a line passing through
the accute angles, will lead to the centre of motion and placed so
near together as to prevent the white caps passing between the obtuse
angles leaving an eighth of an inch between the accute angle and
the teeth when in motion, the principal features of this improvement are
as follows. first the placing of the floats between the rows of teeth which
prevent but wheat or straw forming a wisp around the cylinder, secondly
the bars of the concave made [illegible] and the accute angle placed
within one eighth of an inch of the teeth and so close together as to
prevent the white caps passing between them, thereby every kernel
is compelled to pass over the whol concave which cleans it from
chaff and [illegible] and does not cut the kernel. All the above
improvements are relied on together with the privledge of varying
the proportion, and material as may best suit my fancy, so that all
the while I adhere to my principle and debart not from it.

In testimony whereof. I have hereunto subscribed my
name this 12th day of February 1831

Witnesses.
A Gardiner
I. L. D. Mathies

Abram W. Simmons

Exd. [illegible] (Note)

637[illegible]

Taken from a copy authenticated. Dept. of State 18th Augt. 1835.